United States Patent [19]

Elevitch

[11] 4,425,720
[45] Jan. 17, 1984

[54] COFFEE ROASTER

[76] Inventor: Franklin R. Elevitch, 430 Nevada Ave., Palo Alto, Calif. 94301

[21] Appl. No.: 240,757

[22] Filed: Mar. 5, 1981

[51] Int. Cl.³ ............................................. F26B 9/00
[52] U.S. Cl. .................................. 34/233; 99/443 C; 99/450; 219/386; 219/400; 219/405
[58] Field of Search .............. 219/385, 386, 387, 388, 219/400, 405, 521, 436, 438; 99/450, 447, 286, 443 C; 34/225, 233; 126/275 E

[56] References Cited

U.S. PATENT DOCUMENTS

| | | | |
|---|---|---|---|
| 784,854 | 3/1905 | Grace | 219/388 |
| 1,609,888 | 12/1926 | Secord | 34/233 |
| 1,633,801 | 6/1927 | Williams | 99/323.5 |
| 1,656,709 | 1/1928 | Kelly | 219/388 |
| 1,661,354 | 3/1928 | Ayre | 219/385 |
| 2,511,328 | 6/1950 | Cline | 126/275 E |
| 3,845,272 | 10/1974 | Schultz | 219/386 |
| 4,271,603 | 6/1981 | Moore | 34/233 |

FOREIGN PATENT DOCUMENTS 733201 4/1966 Canada .................................. 219/385
129456 4/1901 Fed. Rep. of Germany.

*Primary Examiner*—Larry I. Schwartz
*Attorney, Agent, or Firm*—Edward B. Gregg

[57] ABSTRACT

Coffee roaster, preferably having no moving parts and suitable for domestic use, in which a current of hot air is caused to pass through a layer of coffee beans supported on a perforated plate or belt, the space above the beans being enclosed by sidewalls and a top cover having one or more openings for outflow of air. The top cover causes heat to be radiated back onto the beans and the flow of hot air causes water vapor and other gases resulting from roasting, also smoke, to be rapidly removed from the beans and vented. In a variant the roaster may be enclosed in an oven and the cover of the oven may be imperforate, the oven being provided with means to vent air, water vapor and other gases.

7 Claims, 5 Drawing Figures

U.S. Patent   Jan. 17, 1984   Sheet 1 of 2   4,425,720
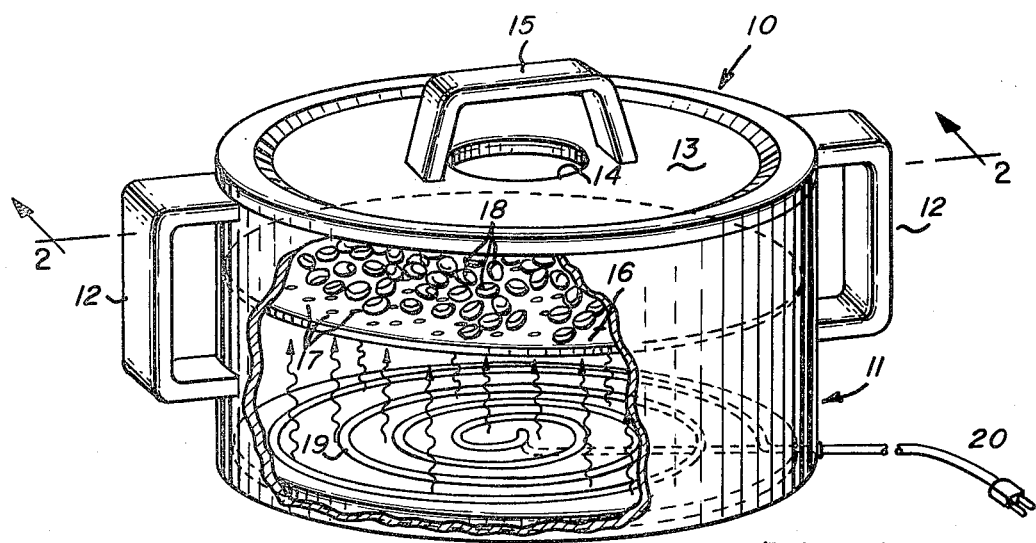
Fig_1
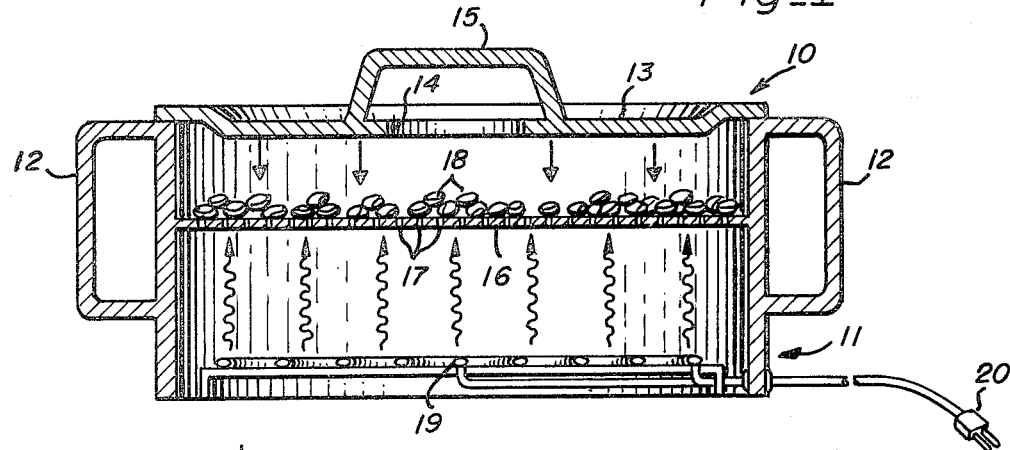
Fig_2
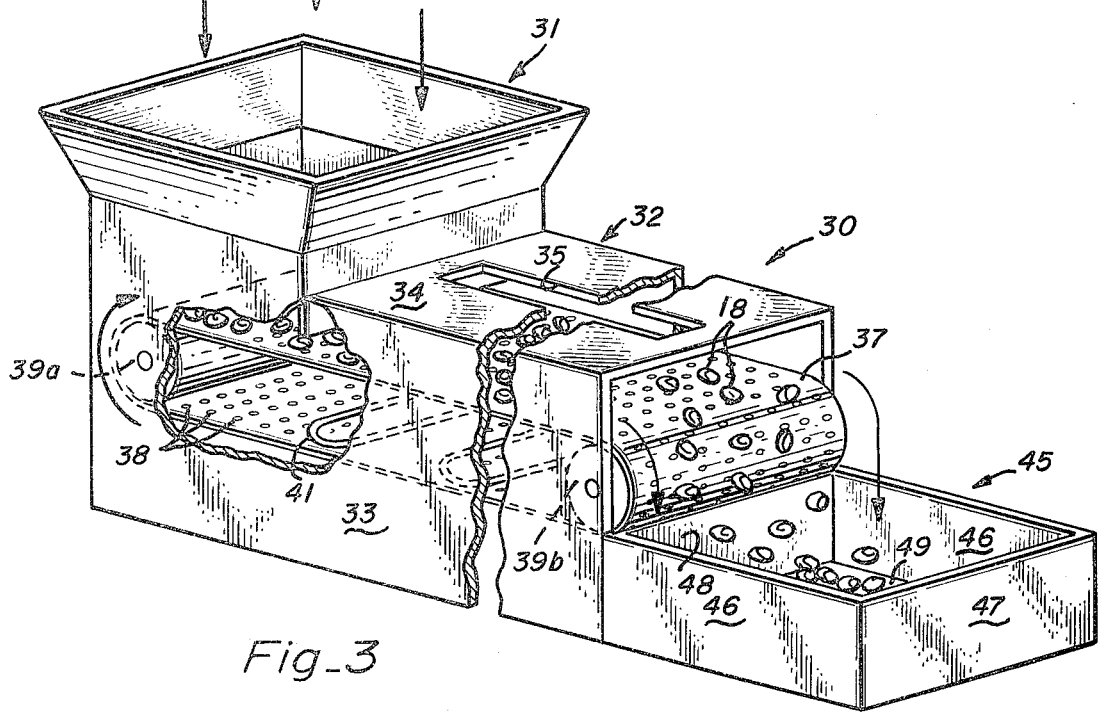
Fig_3

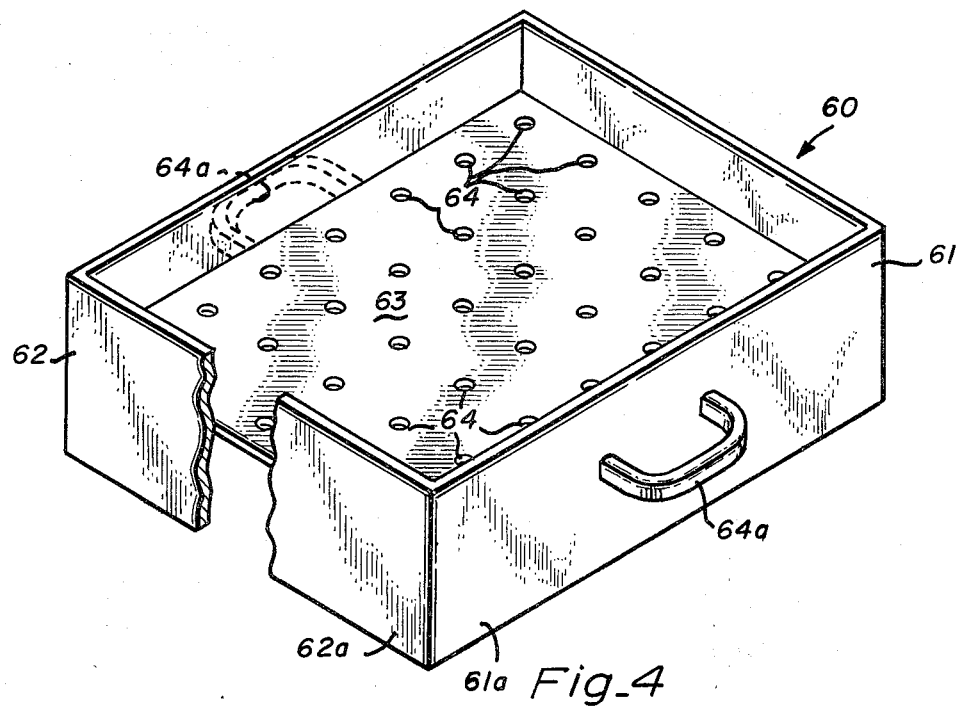
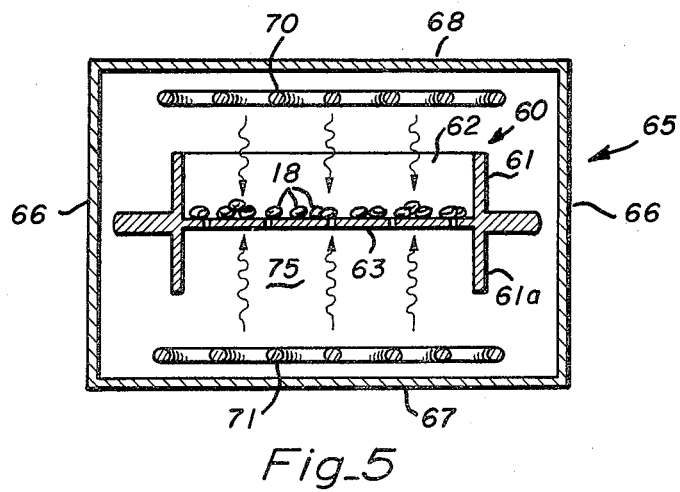

COFFEE ROASTER

Coffee roasters heretofore have been relatively elaborate and have involved a multiplicity of moving parts. A need exists for a simplified coffee roaster which can be employed for domestic use and which will adequately roast coffee beans and which has no moving parts.

Generally speaking, coffee roasters heretofore, including those which are intended for small scale commercial use or for domestic use, have employed active means for tumbling a mass of coffee beans as they are roasted, such tumbling action being intended to promote uniform exposure of the beans to each other, to the walls of the roaster and to hot air. Such roasters required rather elaborate equipment such as stirrers, rotating drums or spheres, blowers, etc.

Hereinafter coffee roasters and coffee roasting will be referred to. However, the apparatus and method of the invention are also applicable to roasting other seeds and nuts, e.g. sunflower seeds, pumpkin seeds, hazelnuts, almonds, peanuts and cereal grain such as corn and wheat. Nuts may be roasted in the shell where such is practical or the nuts may be shelled.

There is a need for a coffee bean roaster having no moving parts and which requires only a source of heat and access to ambient air.

It is an object of the invention to provide improvements in coffee roasters.

It is a further and particular object of the invention to provide a simplified coffee roaster adapted for domestic use which employs no moving parts.

Yet another object is to provide a commercial version of my domestic, simplified coffee roaster having a minimum of moving parts and equipped to provide continuity of operation.

Another object is to provide a simplified method of roasting coffee beans.

The above and other objects will be apparent from the ensuing description and the appended claims.

Certain embodiments of the invention are illustrated by way of example in the accompanying drawings, in which:

FIG. 1 is a perspective view of a coffee roaster intended for domestic use, a portion of the exterior wall being broken away to reveal the interior of the roaster;

FIG. 2 is a vertical mid-section taken along the line 2—2 of FIG. 1;

FIG. 3 is a perspective view of a continuous coffee roaster employing the principles of the domestic roaster of FIGS. 1 and 2, but being adapted for continuous operation, and hence for commercial use.

FIG. 4 is a perspective view of another embodiment of the invention which is employed in an oven.

FIG. 5 is a vertical section taken through an oven and through the roaster of FIG. 4.

Referring now to FIGS. 1 and 2, the coffee roaster is generally designated by the reference numeral 10, and it comprises a cylindrical housing 11 having handles 12 and a cover 13 which has a central opening 14 and a handle 15. The housing 11 and the cover 13 may be made of any suitable material, such as, for example, cast iron, steel, copper, brass or aluminum. Heat resistant glass, for example, Pyrex, and heat resistant plastic may also be used. The housing need not be cylindrical. For example, it may be rectangular. A plate 16 is provided having uniformly spaced perforations 17 of a size such that they will hold coffee beans shown at 18, but of sufficient size and number to allow and promote operation as described hereinafter. The perforated plate 16 may be supported on a ledge or it may be held in place by welding or by friction. Housing 11 and plate 16 may be an integral unit.

A heating element 19 is provided which is shown in the form of an electric coil having open spaces between the turns of the coil and having a plug 20 which may be plugged into an extension cord which, in turn, may be plugged into a wall socket. Other sources of heat may be provided; for example, the housing 11 may be placed over an electric heating coil or gas burner of a kitchen stove. The source of heat may be an integral part of the roaster, for example, the coil 19 may be fixed to the housing 11 (but separable for cleaning, replacement or repair) or the roaster itself may be without a heating element but adapted to be placed over a source of heat such as an electric coil or a gas burner of a stove.

In operation, coffee beans, as shown at 18, are placed on the perforated plate 16. Preferably a single layer or layers of a few beans in thickness is employed. As many as six to eight beans in thickness may be employed but may require shaking once or twice during roasting. After the cover 13 has been put in place, electric current (assuming that the heating element 19 is an electric coil) is turned on. Air is drawn in through the spaces between the turns of the coil and heat passes upwardly from the coil by convection, as shown by the wavy arrows and through the perforations in the plate 16, and thence through the coffee beans 18, effectively heating them and causing roasting. Heat is radiated back onto the beans by the cover 13 as indicated by the downwardly pointing arrows but the opening 14 (or a multiplicity of smaller openings) allows rapid venting of water vapor, other gases and smoke. Green coffee beans have about 12 to 20 percent moisture content which is driven off by heat together with other gases and smoke. It is important that such gases (including water vapor) and smoke be vented rapidly; otherwise roasting does not occur as desired. It is also important that heat be reflected back, principally by radiation, from the cover.

Several features of the construction combine to achieve rapid and uniform heating and roasting of the beans. Heat is conveyed by convection owing to the passage of hot air through the perforations 17. Heat also is applied by radiation from the heating element 19 and by reflection of heat from the cover 13. At the level of the coffee beans 18 heat is also applied by conduction through the material of the plate 16 and heat is also applied by conduction from the wall of the housing to beans around the perimeter of the mass of beans. Further the beans, as they are roasted, move due to the conversion of liquid moisture into vapor. Such motion of the beans, together with the sources of heat as described above, have the effect of heating and roasting the beans uniformly such that more rapid heating, drying and roasting in some areas than in others is minimized.

The beans undergo change in two stages. In the first stage the beans are dried by the evaporation of moisture, which is carried away by the current of hot air. The second stage is roasting of the dried beans. This occurs when moisture is driven out and the temperature of the beans rises above the boiling point of water. This stage is marked by a change of color from green to various shades of brown.

In at least one prior patent, Sivetz 3,964,175, a mass of coffee beans is levitated by blowing hot air through a mass of beans. In my roaster the flow of air is gentle and no significant levitation occurs. Motion of the beans is slight and is due mainly if not entirely to evaporation of moisture and expansion of the vapor. The beans move about but are not levitated. One may use a blower or vacuum to speed up the drying stage but such is not necessary and it adds a complication.

As stated above the beans change in color from green to a shade or shades of brown. This may be observed through the opening 14 or through the cover if it is transparent. A temperature of about 425° to 475° for about 10 to 20 minutes has been found to be suitable. Experience will suffice to determine, by observation, when the desired degree of roasting is complete, e.g. light, French, etc. It is also desirable to bring the beans quickly to and above their isothermal point, i.e., the point at which moisture begins to boil off.

The beans may be allowed to cool in the roaster. Preferably, however, the cover is removed, the housing is lifted by its handles and the beans are poured out to cool outside the roaster, after which they may be stored and ground as desired.

Instead of using a separate heating element and perforated support, the two may be combined by employing a plate 16 which incorporates resistance elements and which also is perforated as shown, such being supported so that there is an air space beneath the heating element through which air may be drawn.

Referring now to FIG. 3 a roaster generally designated as 30 is shown, which operates on essentially the same principle as the roaster of FIGS. 1 and 2, but it is adapted for continuous operation and, therefore, for commercial usage. The roaster 30 comprises an open feed hopper 31 and a roaster housing 32 extending beyond the hopper and comprising side walls 33, a top cover 34 formed with a slot 35 which serves as an opening comparable to and serving the same purpose as the opening 14 in FIGS. 1 and 2. A barrier 36 effectively seals off the housing 32 from the open hopper 31. A perforated, continuous belt 37 having perforations 38 is provided which is trained about roller 39a and 39b, one of which is driven by suitable means (not shown). The belt may be, for example, a wire screen. Between the upper and lower parts of the belt 37 there is an electric heating coil 41. A box 45 is provided having sidewalls 46, front and rear walls 47 and 48 and a bottom 49. Coffee beans shown at 18 are supplied to hopper 31. the rate at which they are roasted is controlled by any one or more of three variables, namely, the current flowing through the heating coil 41, the speed of the rollers 39a and 39b and the length of the upper part of the belt 37. It will be apparent that, although the device of FIG. 3 employs a moving part, namely the belt 37, its operation is simple and is comparable to that of the roaster in FIGS. 1 and 2. The housing 32 confines the current of hot air from the coil 41 and causes it to flow up through the belt 37 and the beans 18; the cover 34 reflects heat back on the beans; and the opening 35 allows the air to carry away water vapor, other gases and smoke. Side walls 33 perform the same function as the wall of the housing 11. The belt 37 performs the same function as the plate 16 in supporting the beans, in allowing passage of hot air and, by conduction, equalizing the flow of heat to the beans. The belt is preferably of metal, e.g. a metal screen, to promote transfer of heat. The belt may incorporate resistance elements which can be heated electrically to take the place of the heating coil 41. Supply of beans to the belt may be by hand or an automatic feed. A single layer or a layer several beans thick is supplied. Instead of an open hopper a rotary type of feed of known construction may be used which supplies beans in increments and which closes off the belt from the ambient atmosphere. Further, the open outlet end of housing 32 may be adequate for venting air, water vapor and other gases so that venting slot 35 is unnecessary. Instead of applying heat from below by coil 41, heat may be applied from above.

In the description hereinabove and in the drawings, whole beans are described and are shown. The beans, however, may be comminuted before they are roasted. The term "beans" as used in the claims is intended to include whole beans, which are preferred, but also comminuted beans. Preferably, however, whole beans are roasted. Among other things, during roasting of whole beans, the skins separate and form chaff which can be removed by shaking the roasted beans in a sieve or vegetable strainer. Also, while green beans have been referred to above, partially or wholly dehydrated beans (whole beans or comminuted beans) may be roasted. The use of dehydrated beans will accelerate roasting because the time needed for removing moisture from green beans will be saved.

Referring now to FIG. 4 another embodiment of the roaster of the invention is there shown. It comprises a tray generally designated by the reference numeral 60 formed by sidewalls 61, end walls 62 and a bottom portion 63 formed with perforations 64. The side walls 61 have downward extensions 61a and the end walls 62 have downward extensions 62a. The tray is provided with handles 64a.

Referring now to FIG. 5, this tray is deposited in a typical oven generally designated by the reference numeral 65 comprising side walls 66, a bottom 67, a top 68, an upper electric heating element 70 and a lower heating element 71. The oven has a rear wall 75 and a front door (not shown). The oven is also provided, as is usual, with a vent at the front (not shown) through which gases may escape. The tray is supported within the oven upon a conventional wire rack (not shown) which are standard features of domestic ovens.

In operation either the top element 70 or the bottom element 71 is turned on. The natural convection pattern of the oven will cause air to rise through the openings 64 in the tray 60, thence through the beans. If the bottom element 71 is turned on, the top 68 of the oven will act as a reflector of radiation. If the top element is turned on, it will radiate heat onto the beans and induce an upward current of air. The significant space is that surrounding the layer of beans. Uniformity of temperature, hence uniformity of roasting, is promoted in this space by a number of factors including reflection of heat by the cover 68, convection currents, the chimney effect of the side and end walls 61 and 62 and their downward extensions 61a and 62a, and the conduction of heat by the material of the tray.

Added features for the various embodiments of the invention include a temperature regulator to control temperature of the roaster, a timer to shut off the input of heat after a predetermined time and a reflectance meter to sense the color of the beans. Instead of a reflectance meter, a smoke detector may be used which will indicate the completion of roasting by sensing concentration of particulate matter in the effluent gas and smoke. A reflectance meter or smoke detector may actuate an audible or visual signal or by suitable electronics, it may turn off the heat. These adjuncts are useful but they are not necessary. In the appended claims whenever the term "coffe beans" or "coffee" is used, it is to be understood that other seeds and nuts may be used in place of coffee.

It will therefore be apparent that new and useful apparatus and methods of roasting coffee beans have been provided.

I claim:

1. A roaster adapted to roast green coffee beans which comprises:
   (a) a horizontal support formed with a multiplicity of openings which are small enough to retain a thin layer of coffee beans on the upper surface of the support, the number, pattern and area of the openings being such that radiant heat and hot air will pass freely through the support,
   (b) a housing for the support which surrounds and confines the support and forms with the support an open upper compartment above the support and an open lower compartment below the support, the height of the upper compartment being substantially equal to or less than the depth of the lower compartment but sufficient to confine a thin layer of coffee beans during roasting,
   (c) a reflector above the upper compartment capable of reflecting radiant heat back upon a layer of coffee beans on the support, such reflector being so designed and placed that it will not materially impede evacuation, by convection, of gases and smoke generated by the roasting process, and
   (d) a source of radiant heat at the level of or beneath the horizontal support adapted to heat the horizontal support and a layer of coffee beans uniformly,
   (e) the space between the horizontal support (a) and the source of radiant heat (d) being substantially unobstructed,
   the design and configuration of the horizontal support, the housing and the reflector being such that during roasting of coffee beans on the horizontal support air heated by the source of radiant heat moves freely, uniformly and directly upwardly from the source of radiant heat through the lower compartment and through the horizontal support and the layer of coffee beans into the upper compartment and out of the roaster, such movement being induced substantially solely by such radiant heat whereby the green coffee beans are heated by the combination of radiation, conduction and convection to their isothermal point, moisture is evaporated from the beans at such isothermal point and the temperature of the dried beans then rises to effect roasting of the beans and development and retention of a desirable flavor.

2. The roaster of claim 1 wherein the horizontal support is of metal construction.

3. The roaster of claim 2 wherein the metal is aluminum.

4. The roaster of claim 3 wherein the horizontal support is a perforated plate.

5. The roaster of claim 2 wherein the reflector is in the form of a cover for the upper compartment which is formed with at least one opening for venting of gases and smoke, such opening or openings sufficing to allow rapid outflow of gases and smoke by convection.

6. The roaster of claim 2 wherein the reflector is spaced from the top edge of the upper compartment and the space between the reflector and such top edge provides for escape of gases and smoke.

7. The roaster of claim 2 wherein the source of radiant heat is secured to the housing at or close to the lower edge of the lower compartment.

* * * * *